May 5, 1959     G. B. BRUECKER     2,885,209
TILTABLE MANURE SPREADER WITH LIQUID RETAINING BOTTOM
Filed Aug. 31, 1956     3 Sheets-Sheet 1
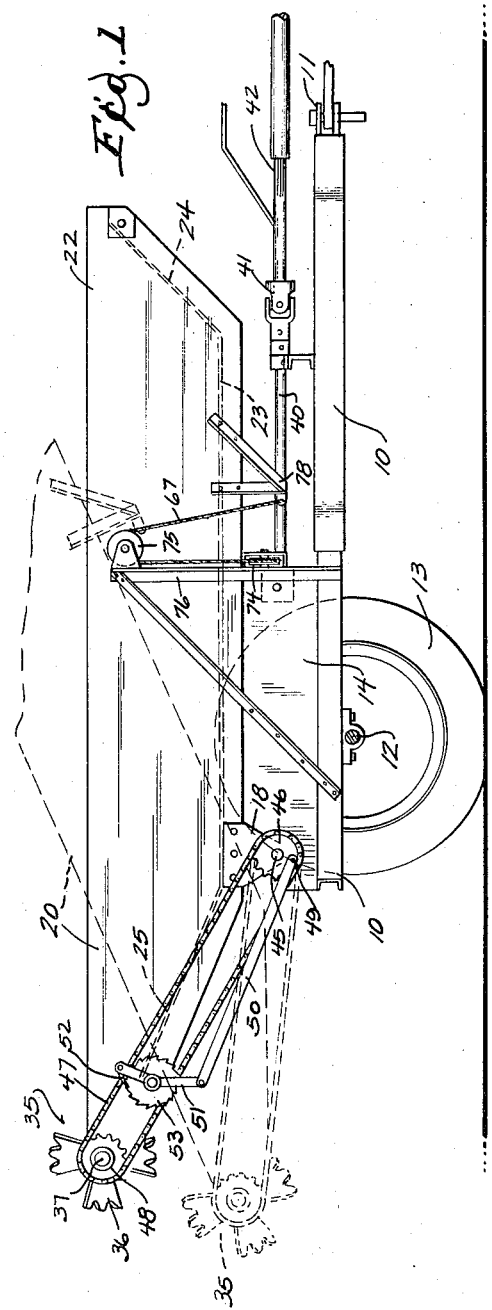
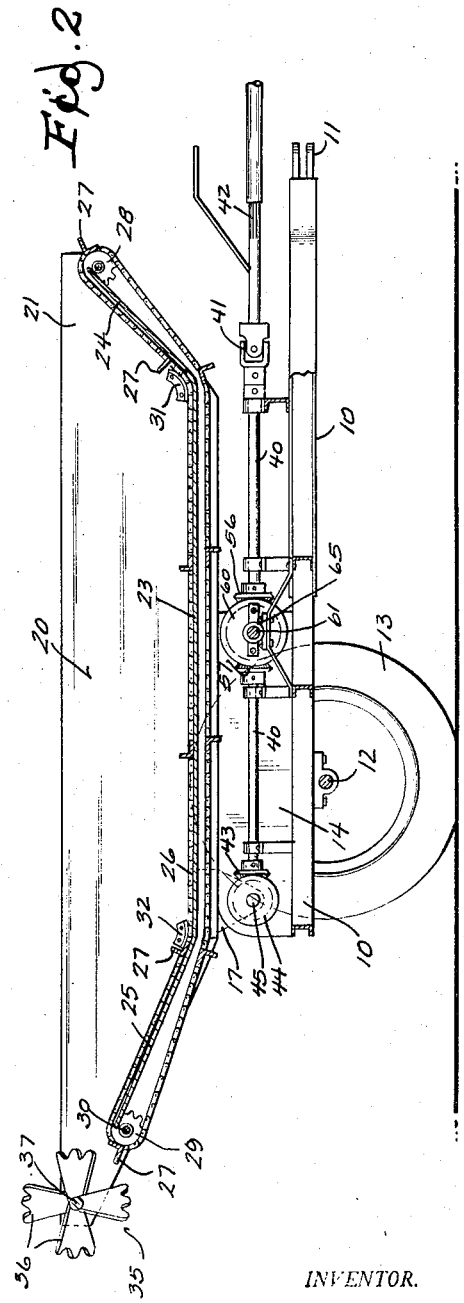
INVENTOR.
GEORGE B. BRUECKER
BY
Wheeler, Wheeler & Wheeler
ATTORNEYS

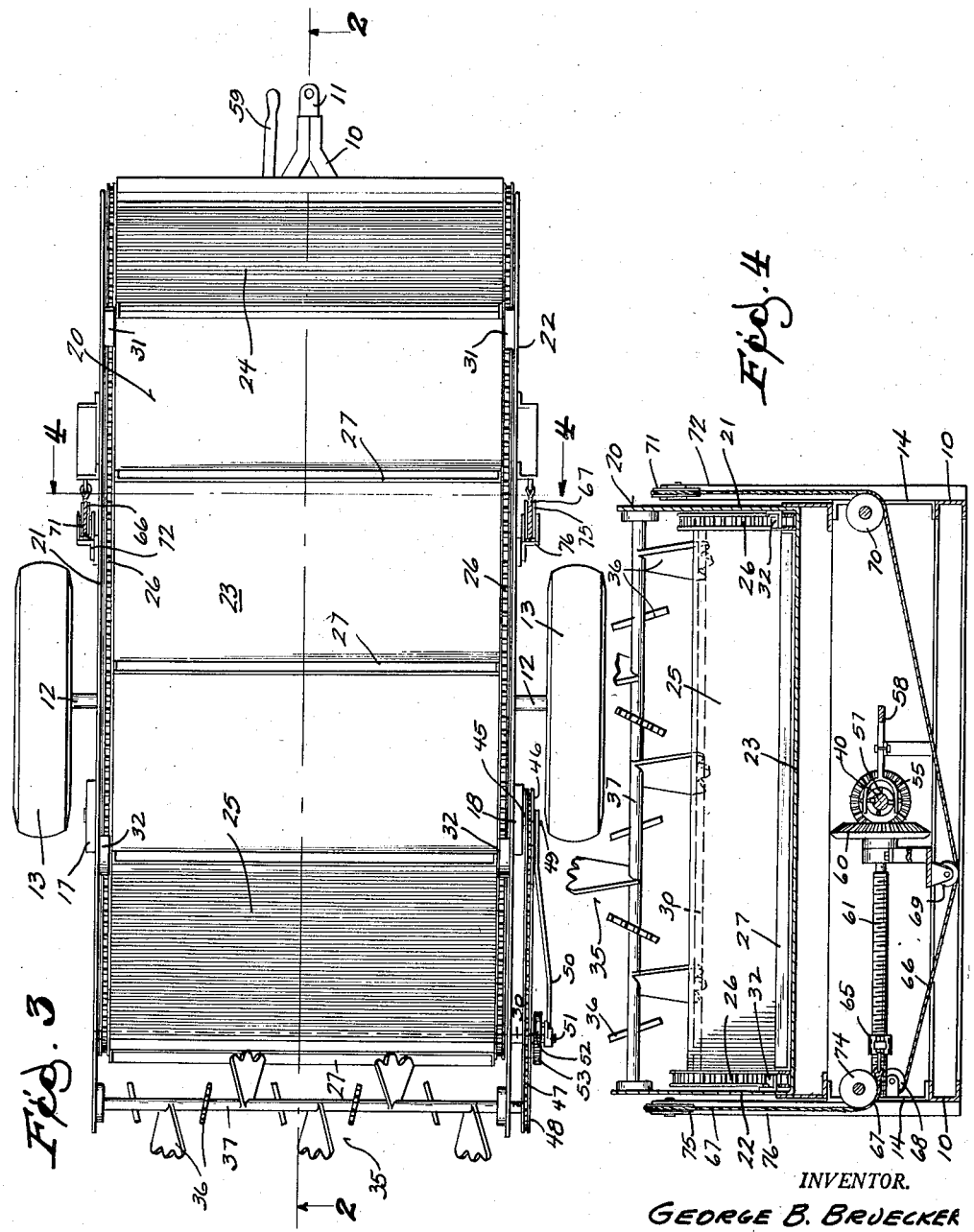

May 5, 1959
G. B. BRUECKER
2,885,209
TILTABLE MANURE SPREADER WITH LIQUID RETAINING BOTTOM
Filed Aug. 31, 1956
3 Sheets-Sheet 3
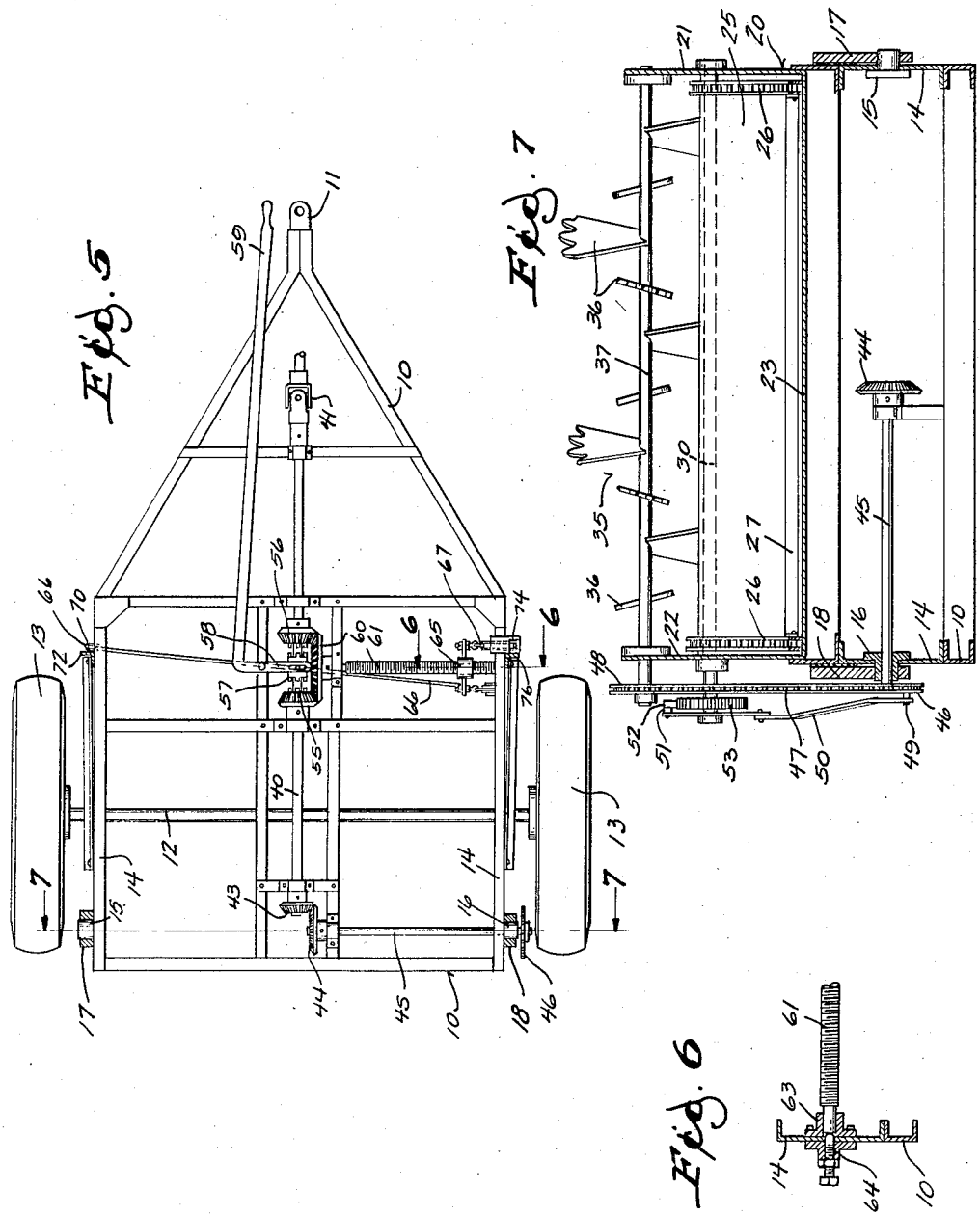
INVENTOR.
GEORGE B. BRUECKER
BY
Wheeler, Wheeler + Wheeler
ATTORNEYS United States Patent Office 2,885,209
Patented May 5, 1959

2,885,209

TILTABLE MANURE SPREADER WITH LIQUID RETAINING BOTTOM

George B. Bruecker, Kaukauna, Wis.

Application August 31, 1956, Serial No. 607,335

3 Claims. (Cl. 275—6)

This invention relates to a tiltable manure spreader with liquid retaining bottom.

A broad box with a closed bottom and inclined ends is pivoted to a wheeled chassis and provided with an endless conveyor which follows the end and bottom of the box from front to rear and returns beneath the box. The conveyor delivers contents of the box to a beater mounted transversely of the rear of the box and driven from a power shaft which extends longitudinally from the box and is geared to a transverse shaft substantially coaxial with the fulcrum upon which the box is tiltable. From this transverse shaft, the feeder is driven by a chain and the conveyor is driven through a ratchet mechanism for progressively advancing the contents of the box to the beater, the box being tilted progressively in the course of the discharge of its contents.

Tilting is accomplished by means of a screw and nut having reverse driving connections from the power shaft above referred to, the nut having cables attached to the box and running over masts carried at each side of the box on the chassis.

In the drawings:

Fig. 1 is a view in side elevation of the device embodying the invention.

Fig. 2 is a view of the device in longitudinal section on line 2—2 of Fig. 3.

Fig. 3 is a plan view of the device.

Fig. 4 is a view taken in section on line 4—4 of Fig. 3 and shown on a slightly enlarged scale.

Fig. 5 is a plan view of the chassis with the box removed.

Fig. 6 is a detail view on an enlarged scale taken on line 6—6 of Fig. 5.

Fig. 7 is a view on an enlarged scale taken in section on line 7—7 of Fig. 5.

In the particular embodiment shown, the chassis comprises a frame 10 provided with a tractor hitch 11, axle 12 and wheels 13. Sides 14 erected on the frame have studs 15 and 16 projecting laterally for the pivotal support of the body 20. Stud 16 is tubular for a reason hereinafter to be described.

The body 20 comprises spaced side walls 21, 22 in closed connection with a bottom 23, front wall 24 and an inclined rear discharge apron 25. Ears 17 and 18 connected with the body are engaged on the studs 15 and 16 to fulcrum the body for tilting movement between its normal horizontal position shown in full lines in Fig. 1 and the dotted line position of Fig. 1.

A conveyor apron comprising chains 26 and cross slats 27 sweeps the entire interior across the bottom. The chains are provided with forward sprockets at 28 and rearward sprockets at 29, the latter being mounted on a cross shaft 30 through which power is provided. Intermediate guides at 31 and 32 hold the chains down to the surface of the interior of the body as best shown in Fig. 2. The return run of the chains is disposed beneath the body.

At the rear of the body, immediately beyond the end of the inclined discharge apron 25, is a beater 35 which comprises a plurality of flights 36 at various angles on beater shaft 37.

Chassis frame 10 provides bearings for a power shaft 40 which extends longitudinally and is provided with a universal joint 41 for connection with the telescopically extensible power takeoff shaft 42 which may be powered by the tractor which draws the spreader. The tractor itself is not shown.

At its rear end, the shaft 40 has a bevel gear at 43, meshing with driven gear 44 on a cross shaft 45 which extends through the tubular stud 16 as best shown in Fig. 7. Externally of the sides 14 of the chassis, shaft 45 carries a combination crank disk and sprocket 46. The sprocket teeth are connected by chain 47 with another sprocket 48 on the beater shaft 37 for the rapid rotation of the beater to spread the manure delivered thereon by the conveyor device 27. The crank pin 49 on the sprocket and crank disk 46 is connected by connecting rod 50 with a lever 51 oscillatable on the end of conveyor shaft 30 and provided with a pawl 52. This pawl rides on the periphery of ratchet wheel 53 which is fixed to shaft 30. In each rotation of disk 46 on the cross shaft 45, the lever 51 makes a single oscillation which advances ratchet wheel 53 by one tooth, thereby advancing the conveyor apron rearwardly in the bottom of body 20 to deliver additional material to the rapidly rotating beater.

Concurrently with movement of the conveyor apron within the body, the body is tilted so that any liquids contained therein are progressively drained from the rear end of the body and the movement of the solids toward the beater is expedited without requiring the conveyor to lift such solids over the discharge apron 25.

For controlling tilting movements by power, the shaft 40 supports a pair of beveled pinions 55 and 56 which are free of the shaft except as connected thereto by the normally centered jaw clutch collar 57 which may be shifted axially of the shaft by the shifting lever 58 from which handle 59 projects forwardly to a point within the reach of the operator.

The pinions 55 and 56 mesh with driven gear 60 at the inner end of screw 61. The end of the screw is desirably provided with a bearing 63 and an adjustable bearing screw 64 as best shown in Fig. 6. The nut 65 threaded on screw 61 has cables 66 and 67 connected to it to receive motion from the nut. Cable 66 operates over pulleys 68, 69, 70 and 71, the latter being mounted on a mast 72 erected at the side of the tiltable body 20. Cable 67 extends about pulley 74 and pulley 75, the latter being mounted on a mast 76 at the opposite side of the vehicle from mast 72. The ends of both cables connect to brackets which depend beneath the body as shown at 78 in Fig. 1, the arrangement being such that as the screw 61 is rotated by power to advance the nut 65 from the outside of the body toward the center thereof, motion is communicated through the cables 66 and 67 to brackets 78 at opposite sides of the body to oscillate the body about studs 15 and 16 toward the dotted line position in which the body 20 is shown in Fig. 1. Reversal of the jaw clutch collar 57 to engage the opposite pinion and to rotate the screw 61 in the opposite direction will permit the body to swing back under its own weight to the full line position which is shown in Fig. 1.

With the power takeoff shaft 42 in operation, the beater 35 will be in continuous rotation and the conveyor apron within the body will be in step-by-step movement rearwardly. While the apron and the beater operation are continuous as long as the power takeoff shaft is driven from the tractor, the tilting of the body is subject to manual control. It may occur progressively as the apron operates or it may be started and stopped as desired. In freezing weather, the body may be tilted to the position shown in dotted lines in Fig. 1 before manure is placed in the body, in order that all liquid will drain off without freezing to the body or the conveyor.

The provision of a power driven shaft operated from the power takeoff shaft of the tractor is a very desirable feature, particularly since my organization is such that I am able to supply power to the beater and the conveyor chain and the body hoist without unduly elevating the height of the body. In fact, with the body tilted to the position shown in dotted lines in Fig. 1, its discharge end is desirably low in proximity to the ground. In order to obtain this low mounting, it is advantageous to drive coaxially with the axis of oscillation upon which the body is tilted. In addition, the use of the same power shaft to provide rapid rotation of the beater and very slow advance of the conveyor apron provides a simple, inexpensive way of actuating these parts.

I claim:

1. A device of the character described comprising the combination with a wheeled chassis having a longitudinal drive shaft and power take-off drive means therefor, of a transverse cross shaft geared to the drive shaft and provided with bearing means adjacent the rear of the chassis, a liquid tight body having a closed bottom from which a rear wall portion extends at an upward inclination beyond the cross shaft, pivot means rearward of the axle upon which the body is pivotally supported from the chassis substantially coaxially with the cross shaft for oscillation of the body in a direction to lower said rear wall portion, a beater mounted at the rear of the body near the end of the rear wall portion, a motion transmitting connection between the beater and the cross shaft, a conveyor having a run within the body extending across the bottom of the body and upwardly toward the rear of the rear wall portion, said conveyor having a drive shaft near the rear of the rear wall portion provided with a ratchet, a pawl lever pivoted substantially coaxially with the conveyor drive shaft and having a pawl engaged with the ratchet, a crank pin mounted on the cross shaft and provided with a crank connected with the pawl lever, a screw shaft provided with bearings on the chassis, clutch-controlled means for driving the screw shaft from the power shaft, a nut threaded on the screw shaft, cables connected with the nut, masts on the chassis at opposite sides of the forward end of the body provided with elevated pulleys over which said cables are trained, said cables thence extending downwardly and being connected with forward portions of the body for tilting the body about said pivot means for the assistance of the conveyor in discharging the contents of the body over said rear wall portion, the beater being drivable in any oscillatory position of the body and independently of movement of the wheels.

2. The device of claim 1 in which the conveyor has a return run beneath the body and guide means near the top of the body adjacent the front and rear ends thereof, said conveyor comprising chains and cross slots, and means for holding near the body bottom the conveyor run first mentioned.

3. The combination with a chassis comprising a frame, an axle, and wheels, of a liquid-tight body having a bottom wall portion, side wall portions, and front and rear wall portions all in liquid tight connection to provide a liquid-retaining box of substantial depth, means providing a pivotal connection between the body and the chassis frame at a point behind and above the axle and at the rear end of the chassis and materially forwardly of the rear end of the body, said body rear wall portion having an upward inclination from the bottom wall portion adjacent said pivotal connection toward the level of the top of the body at the rear end thereof, the body being tiltable about said pivotal connection from a normal generally horizontal position in which its contents are retained and a tilted discharge position in which its liquid contents can flow by gravity over said rear wall portion, the location of said pivotal connection means behind the axle accommodating free tilting movement of the body to said discharge position without interference with the axle, power-operated hoist means having a driving connection and disposed on the chassis and connected with the body for tilting the body toward said discharge position, a beater mounted near the top of the body at the rear of said inclined rear wall portion and comprising a shaft extending transversely of the body, and beater blade means on said shaft, a drive shaft extending longitudinally of the chassis above the axle, a motion transmitting connection from the drive shaft to the beater shaft including a cross shaft co-axial with the pivotal connection between the body and chassis, said body being provided with a discharge conveyor having guide means adjacent the front and rear ends of the body and having a rearwardly operable run in contact with and extending along the bottom portion and the upwardly inclined body rear wall portion, said conveyor having a return run beneath the body and said conveyor comprising side chains and transverse slats adapted to propel solid contents of said body through and exposed to liquid contents thereof, and means for actuating said conveyor from said motion transmitting connection from which the beater shaft is driven.

References Cited in the file of this patent

UNITED STATES PATENTS

| | | |
|---|---|---|
| 1,069,749 | White | Aug. 12, 1913 |
| 1,195,489 | Martin | Aug. 22, 1916 |
| 1,515,329 | Barkmann et al. | Nov. 11, 1924 |
| 1,969,173 | Hansen | Aug. 7, 1934 |
| 2,233,111 | Roberts | Feb. 25, 1941 |
| 2,360,126 | Griffiths | Oct. 10, 1944 |
| 2,597,052 | Barker | May 20, 1952 |
| 2,653,028 | Templeton | Sept. 22, 1953 |